United States Patent Office 3,658,788
Patented Apr. 25, 1972

3,658,788
AMINOOXAZOLINES AND PRODUCTS THEREOF
AND PROCESSES FOR SYNTHESIZING SAME
Leslie E. Orgel and Robert A. Sanchez, La Jolla, Calif., assignors to The Salk Institute for Biological Studies, San Diego, Calif.
No Drawing. Filed June 6, 1969, Ser. No. 831,201
Int. Cl. C07d 51/52
U.S. Cl. 260—211.5 R
29 Claims

ABSTRACT OF THE DISCLOSURE

Aminooxazolines having uses in organic chemistry, biochemical research, and biochemistry and the method for making same comprising reacting a reducing sugar having an hydroxyl group on a carbon atom adjacent the carbonyl or hemiacetal carbon atom of the sugar with cyanamide or cyanogen plus ammonia in solution to thereby form an aminooxazoline in which the carbonyl or hemiacetal carbon and the aforesaid adjacent carbon of the sugar form part of the oxazoline ring.

A method for producing glycosides, e.g., nucleosides and nucleotides of the reducing sugars, including their cyclo-derivatives, which have biochemical and pharmaceutical uses, comprising reacting the aforementioned aminooxazolines with (a) a first group of electrophilic reagents such as cyanoacetylene, methyl propiolate, dialkyl acetylenedicarboxylates, haloacrylonitriles or (b) with a second group of electrophilic reagents, comprising β-diketones and β-ketoesters.

BACKGROUND OF THE INVENTION

The invention described herein was made in the course of or under a grant from The National Science Foundation, an agency of the United States Government.

This invention relates to the synthesis of aminooxazoline derivatives of reducing sugars and to the synthesis of sugar-based, pyrimidine compounds, in particular, nucleosides and nucleotides.

Extensive research has been, and continues to be, carried out to obtain a more complete understanding of complex sugar chemistry. This research is principally directed towards several obejctives which are substantially interrelated. One objective is to obtain a complete understanding of basic biochemical processes. Further objectives include the study of the chemical and physical properties of biologically-interesting sugars and sugar derivatives. To attain these objectives, it is necessary to synthesize sugar-based compounds such as those which are similar to or identical to the nucleosides and nucleotides found in living matter.

Heretofore, these compounds have been made available either by their extraction from living matter or by synthetic methods. Extraction methods are obviously limited and the separation procedures are generally complex. Synthetic methods are more flexible but must overcome serious obstacles. Starting compounds such as pyrimidines and related heterocyclic, and particularly sugars, are sensitive to many chemical reagents and must often be masked to prevent alteration or damage. These masking procedures require additional synthetic steps. Furthermore, biological activity is highly dependent on stereochemical configuration. Most current synthetic methods produce mixtures of isomers which, in general, are difficult to separate, and therefore, many biologically-important molecules remain rare and expensive. Herein lies the great value of synthetic methods that are simple, efficient and stereospecific.

In addition to merely obtaining the end result of particular biochemical reactions, it is often necessary to understand the exact mechanism by which intermediate reactions occur. Various analytical techniques may be employed to accomplish these studies. An important technique employs isotopically-labelled molecules. The position of these isotope labels in the molecules or their locations within an organism can be determined and, from this, the intermediate reactions can be deduced. At present, such isotope-labeling is made difficult by the numerous reactions required to produce the complex molecules. This is a major reason for which simple and unambiguous syntheses of such molecules are urgently needed.

SUMMARY OF THE INVENTION

This invention comprises reacting particular reducing sugars with cyanamide or with cyanogen plus ammonia to produce particular aminooxazolines. The reaction preferably proceeds in an alkaline medium. Additionally, it comprises the reaction of such aminooxazolines with: (a) a first group of electrophilic reagents selected from the group comprising cyanoacetylene, methyl propiolate, dialkyl acetylene-dicarboxylates, such as dimethyl, diethyl, and dipropyl acetylene dicarboxylate, and haloacrylonitriles such as chloro- and bromoacrylonitrile, or with a second group of electrophilic reagents selected from the group of (b) β-diketones and β-ketoesters, to add a nitrogenous base, e.g., cytosine and uracil, to the reducing sugar at its hemiacetal or carbonyl carbon position.

There appear, at present, to be two major reasons why the method of this invention is a substantial improvement in the art. The first is that the ultimate products can be produced completely or substantially free of their stereoisomers so that little or no separation of isomers is required. Because of these advantages, the formation of complex, sugar-based compounds by the method of this invention is relatively inexpensive. These ultimate products are produced at a very significantly reduced cost of manufacture in comparison with former synthesis or extraction techniques. This greatly reduced cost is attributed to the use of very mild reaction conditions in carrying out this invention, to the relatively high yields of about 60% (overall), and to the substantial freedom of the products from isomers.

A further advantage is that the complex, sugar-based molecules can be readily isotope-labeled employing the method of this invention. This advantage results from the use of relatively simple starting reactants, e.g., cyanamide and cyanogen which can be easily labeled, and from the relatively direct and simple reactions involved in the method of this invention to produce the complex sugar-based compounds. The use of labeling is thus facilitated and expanded by the present invention in the biochemical area.

The aminooxazolines produced by the method of this invention are unique in that they include a reducing sugar molecule which is uniquely associated with an aminooxazoline ring in that the carbonyl or hemiacetal carbon atom and an adjoining carbon atom of the sugar molecule are common to both the sugar and oxazoline rings. Although amino—and other e.g., alkyl—oxazolines have been previously synthesized, they have not had this structure and, for this reason, have not been useful for synthesizing the cycloglycosides and glycosides obtainable from the aminooxazolines of this invention. A few representative oxazolines which are presently available include: alkyl oxazolines in which the hemiactal carbon is not involved in the oxazoline ring and the oxazoline is not aminooxazoline; substituted imidazolines involving the hemiacetal carbon of the sugar but in which the hemiacetal and adjacent sugar carbon atoms are both linked to nitrogen atoms in the imidazoline ring; and alkyl, aryl and thiol oxazolines involving the hemiacetal carbon of the sugar, but in which the hemiacetal carbon is bonded to oxygen rather than nitrogen as in the aminooxazolines of this invention. Aminooxazolines have also been prepared but differ from those of this invention in not containing a sugar molecule.

The aminooxazolines of this invention are highly useful as chemical intermediates for the synthesis of glycosides, such as the pyrimidine glycosides, e.g., non-naturally-occurring compounds such as β-cytosine arabinoside, and naturally-occurring compounds such as β-uracil arabinoside. Non-naturally-occurring nucleosides, sometimes designated as "nucleoside analogs" because of their similarity to naturally-occurring nucleosides, show a great deal of biological activity. As such, they are extremely valuable both to fundamental research and to the pharmaceutical industry. Naturally-occurring nucleosides are important for their use in the synthesis of oligonucleotides and nucleic acids, in studies of metabolism and genetic mechanisms, as diet supplements and for the synthesis of vitamins and other biological compounds.

DESCRIPTION OF THE PREFERRED EMBODIMENT

In general, this invention comprises novel aminooxazoline intermediates and processes for producing such intermediates comprising reacting a reducing sugar having a hydroxyl group attached to a carbon atom adjoining the sugar's carbonyl or hemiacetal carbon atom with cyanamide or with cyanogen plus ammonia. More specifically, the reaction of these reducing sugars and cyanimide or its aforementioned equivalent by the process of this invention produces aminooxazoline intermediates in which the oxazoline ring includes the hemiacetal or carbony carbon atom and the adjoining carbon atom of the reducing sugar.

This invention further encompasses the reaction of such aminooxazoline intermediates with (a) certain electrophilic reagents selected from the group consisting of cyanoacetylene, methyl propiolate, dialkyl acetylenedicarboxylates and halocrylonitrile, and with (b) other electrophilic reagents comprising β-diketones and β-ketoesters to produce glycosides, e.g., pyrimidine glycosides, such as nucleotides and nucleosides.

Hereafter, the products produced herein by the reaction of the aminooxazolines and electrophilic reagents will be designated by the term "glycosides." It will encompass both "open" compounds such as cytosine arabinoside and "cyclic or closed-ring" compounds such as the cyclonucleoside (IV) shown structurally in Example 2. "Glycoside," as used herein, has the meaning given to it by those involved in the art to which this invention pertains and does not have the restricted meaning whereby it refers only to the products of a sugar and an hydroxyl-bearing aglycone or other sugar.

The aminooxazoline intermediates and their formation will first be described. As used herein, the terms "amino-oxazoline" or "aminooxazoline intermediate" designate compounds comprising an aminooxazoline group and a sugar group such that the nitrogen atom of the oxazoline ring is attached to the hemiacetal or carbonyl carbon of the sugar and such that the adjoining carbon atom of the sugar is attached to the oxygen atom of the aminooxazoline ring. That is, the aminooxazolines of this invention are 2-amino, 4,5-disubstituted 2-oxazolines wherein the 4,5-positioned carbons of the oxazoline ring are also the hemiacetal and adjoining hydroxyl-bearing carbon of a reducing sugar.

Since the reducing sugars employed herein may have straight chain or cyclic configurations, the aminooxazolines (from monosaccharides) may have the following structures:

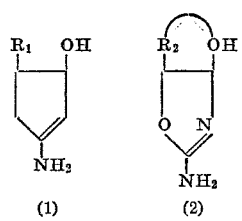

(1) (2)

where $R_1$ may be H-(from glycolaldehyde) or $HOCH_2$—(from glyceraldehyde) and where $R_2$ represents a chain of two or more carbon atoms to produce, with the oxygen atom, e.g., a furanose or pyranose ring. With the reducing sugars capable of having either D- or L-configurations, the aminooxazolines of this invention may have either of the following stereo structures:

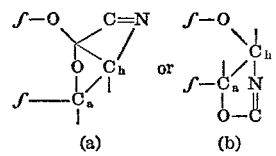

(a) (b)

where the open portion of the above structures, (a) and (b), represents reducing sugars, as shown in (1) and (2) above, having a hemiacetal carbon ($C_h$) and an adjoining or vicinal carbon atom ($C_a$), the particular structure, i.e., (a) or (b), being determined by the stereo structure of the reducing sugar. The above structures (1), (2), (a) and (b) have been shown for monosaccharides, but the foregoing description also applies to disaccharides and to polysaccharides.

The sugars employed herein are reducing sugars and include monosaccharides, disaccharides and polysaccharides. These sugars are characterized by, and herein the term "reducing sugar" designates reducing sugars having a free carbonyl or hemiacetal carbon and a hydroxyl group attached to a carbon atom in the sugar adjacent the carbonyl or hemiacetal carbon atom. The reducing sugars may have from 2 to 12 and more carbons. The monosaccharides useable in this invention include, e.g., glycolaldehyde, glyceraldehyde, erythrose, ribose, arabinose, glucose, fructose, sorbose, mannose, galactose, dihydroxyacetone, erythrulose, xylulose and ribulose. The disaccharides include lactose and maltose, and the polysaccharides include maltotriose and manninotriose. Both the D- and L-stereoisomers of each of the aforementioned sugars may be employed herein.

Reducing sugars useful in this invention may also be substituted if such substituted reducing sugars do not adversely interfere with the formation of the aminooxazoline intermediates of this invention. The term "substituted reducing sugars" refers to reducing sugars in which one or more hydrogen atoms in hydroxyl groups, other than the hydroxyl group on the carbon adjoining the hemiacetal carbon, is or are replaced by various radicals. Examples of substituted sugars include: phosphated reducing sugars such as ribose-5-phosphate, ribose-3-phosphate, arabinose-5-phosphate, arabinose - 3 - phosphate, glyceraldehyde-3-phosphate, and arabinose-3,5-diphosphate; acetylated reducing sugars such as 3,5-di-O-acetyl-D-ribose; and 5-O-benzoyl-D-arabinose.

To produce the aminooxazoline intermediates of this invention, the reducing sugars are reacted with cyanogen and ammonia or with cyanamide. Preferably, cyanamide is employed because it produces higher yields of the amino-oxazolines.

The reaction mechanism by which the cyanamide or cyanogen plus ammonia adds to the reducing sugar to produce an aminooxazoline is not fully understood at present. However, it is presently believed that the reaction mechanism comprises at least two steps—a first step in which the cyanamide or cyanogen plus ammonia adds in straight chain form to the hemiacetal or carbonyl carbon of the sugar and a second step in which the cyclization is completed by formation of an oxygen bond between the cyanamide or cyanogen carbon atom and the carbon atom of the sugar adjoining the hemiacetal or carbonyl carbon.

The theoretically required ratio of cyanamide or cyanogen (assuming a sufficient amount of ammonia which is discussed in the following paragraph) to the reducing sugar is the stoichiometric molar ratio of 1:1. However, in practice, it is preferable to employ cyanamide and cyanogen in concentrations greater than the sugar concentration to increase the aminooxazoline yield. In order to accomplish this as inexpensively as possible, a stoichiometric excess of cyanamide and cyanogen is employed because these reactants are cheaper than the reducing sugars.

Additionally, both cyanamide and cyanogen are very reactive and tend to react with other components, e.g., the solvent, so that, to this extent, they are lost from the aminooxazoline-producing reactions. To obtain the desired yields, this loss must be compensated for by employing additional amounts of cyanamide and cyanogen. The most preferred ratios of cyanamide to reducing sugar lie between ratios of 1:1 and about 2:1 although higher ratios, e.g., 3:1 may be employed. Because of its greater reactivity, cyanogen to reducing sugar ratios of up to about 10:1 may be employed.

The amount of ammonia preferably employed in the synthesis of aminooxazolines from a reducing sugar and cyanogen is an amount which gives a ratio of ammonia to sugar of about 1:1. Good results have been produced using ammonia to sugar ratios of 2:1 to 3:1. If ammonia is also employed to provide a desired alkaline pH, ammonia in excess of the amount required for reaction with the sugar is required.

The reaction between the reducing sugar and cyanamide or cyanogen plus ammonia is preferably carried out in an alkaline medium. However, weakly acid media, e.g., pH 6 may also be employed. In alkaline media, the yield of the aminooxazoline is substantially higher than the yield produced in acid media. Preferably, the reaction media has a pH between about 8 and about 10 although pH's up to about 12 may be employed. To produce the preferred alkaline reaction media, various bases, for example, sodium and potassium hydroxide and aqueous ammonia solution, may be employed.

The reaction may be carried out in a reaction medium which is a suspension or a solvent. Even though the reaction takes place in solution, it is possible to use a suspension because it generally permits a higher recovery of the aminooxazoline. The aminooxazolines are usually at least slightly soluble in the reaction medium and this can significantly reduce the recovery of aminooxazoline product. To reduce the effect of the aminooxazoline solubility, it is preferable to employ a relatively high concentration of the reactants since this produces the highest concentration of aminooxazoline. This, in turn, means that larger amounts of aminooxazoline will precipitate out of the reaction medium since the latter's solubility remains substantially constant. A high concentration of reactants may result in a suspension. As the conversion to aminooxazoline progresses, the reactants initially in solution are used up and replaced by reactants entering the solution from suspension to thereby produce a maximum amount of aminooxazoline.

Preferably, a solvent is selected in which the reducing sugar and cyanamide or cyanogen and ammonia are quite soluble but in which the aminooxazolines are comparatively insoluble. The presently-preferred solvents employed in the reaction are water and mixtures of methanol and water. Theoretically, the reaction of reducing sugars with cyanamide or cyanogen and ammonia to produce the aminooxazolines of this invention should take place in the absence of water. However, in practice, water is presently required in the reactions performed thus far.

The reaction between the reducing sugar and the cyanamide or cyanogen plus ammonia may be carried out at room temperature, at reduced temperatures, or the reaction may be speeded up by heating the reaction medium. After the reaction is substantially complete (indicated by disappearance of the sugar as determined by chemical tests), the aminooxazoline may be isolated by any of several standard techniques, e.g., cooling and filtering off the product, adding a solvent, which causes precipitation of the product, or evaporation of the mixture and purification of the product by recrystallization or chromatography.

The aminooxazolines so produced have a multiplicity of uses. For example, the aminooxazolines may be employed to synthesize a variety of glycosides which, in turn, are also useful as pharmaceuticals and in the study of biological reactions such as, for example, metabolic pathways. The simplicity of the above-described process for producing the aminooxazoline intermediates and the simplicity of the reactants also aids in the foregoing studies in that the complex glycosides can be readily isotope-labeled. These uses and advantages will be more specifically described hereafter in connection with the description of the synthesis of particular aminooxazolines and glycosides.

As described, the aminooxazoline intermediates may be employed to synthetsize glycosides. Glycoside synthesis is carried out by reacting aminooxazolines with either of two groups of electrophilic reagents. One group includes cyanoacetylene, methyl propiolate, alkyl acetylenedicarboxylates where the alkyl group may be, for example, methyl, ethyl and propyl radicals, and haloacrylonitriles where the halogen group may be chlorine or bromine. The second group of reagents includes $\beta$-diketones and $\beta$-ketoesters such as alkyl acetoacetate, e.g., methyl, and propyl acetoacetate, dialkyl acetoacetate, e.g., $\alpha$-ethyl methylacetoacetate, and alkyl arylacetate, e.g., ethyl benzoylacetate, acetoacetaldehyde, acetylacetone, and 3-methyl-2,4-pentanedione.

In general, it is presently believed that the first group of electrophilic reagents reacts with the aminooxazoline intermediate by attachment to the hemiacetal carbon-connected nitrogen of the axozoline ring and with either the non-sugar carbon of the oxazoline ring or with the amino nitrogen of the aminooxazoline structure to form a third or pyrimidine ring in combination with the sugar and oxazoline rings. The resulting structure is herein designated as a cycloglycoside. The foregoing is illustrated by way of example in Example 2 where the aminooxazoline (I) (2-amino-$\beta$-D-arabinofurano [1',2',:4,5] 2-oxazoline) combines with cyanoacetylene to first form a cyanovinyl adduct (III) and, thereafter, to form the corresponding cyclonucleoside (IV). The reaction mechanism by which the $\beta$-diketones and $\beta$-ketoesters react with the aminooxazolines to produce glycosides is not presently known.

The cycloglycoside may be employed to produce a wide variety of compounds—both naturally-occurring and synthetic. For example, the cycloglycosides may be hydrolyzed to the glycosides as shown by way of example in Example 2 where the cycloglycoside (IV) is hydrolysed to its glycoside (V) (cytosine arabinoside). Alternatively, the cycloglycosides may be reacted with various nucleophilic reagents containing, e.g., iodides, thiolates and benzoates, to break the bond of the oxazoline oxygen atom to the sugar carbon atom and simultaneously add the aforementioned groups to the sugar carbon atom. Thereafter, this added group may be removed or altered as, for example, in the catalytic reduction reaction of thiolates with Raney nickel. In this manner, a deoxyglycoside, e.g., 2'-deoxycytidine, can be produced from an "oxy" sugar, e.g., D-arabinose.

The synthesis of glycosides from the reactions of the aminooxazolines of this invention with the electrophilic reagents described herein proceeds through several stages, the natures of which are variable and depend upon many factors. It is theoretically possible that a cycloglycoside, e.g., IV in Example 2, could be produced from an aminooxazoline, e.g., I of Example 2, in the absence of water. However, in the reactions presently studied in detail, the reaction stops at the adduct (e.g., III in Example 2). When water is thereafter added, or if water is initially present, the reaction product is a cycloglucoside.

The amount of electrophilic reagent preferably employed for reaction with the aminooxazolines of the invention is such as to provide an electrophilic reagent to sugar ratio of at least 1:1 (stoichiometric ratio). The actual amount employed depends to some extent upon the other components in the reaction medium. For example, because of their high reactivities, amounts of electrophilic reagent sufficient to give ratios of reagent to reducing sugar of about 2:1 or more are effectively employed when water and/or ammonia are present in the reaction medium since the latter react with the electrophilic reagents to effectively remove them from aminooxazoline formation.

The conversion of the aminooxazoline intermediates, as described above, is carried out in a solution although suspensions may be employed by using amounts of the aminooxazoline greater than the amount which will solubilize in the particular solvent employed in the reaction. The solvent employed depends upon the particular aminooxazoline intermediate and includes, for example water, dimethylacetamide, methanol and combinations of these solvents. In certain cases, the electrophilic reagent itself in excess may function as the solvent.

The reaction may be carried out at room temperature or at elevated temperatures to increase the reaction rate. The glycoside and cycloglycoside products produced may be separated from their reaction solutions by well-known methods, e.g., evaporation, extraction, precipitation, and chromatography. Although the reaction conditions are mild and reaction times are short, the glycoside products are produced in relatively pure form and in overall yields of about 60%.

The synthesis of particular aminoxazoline intermediates and the products produced therefrom will now be described.

EXAMPLE 1

This example illustrates the conversion of D-arabinose to its corresponding oxazoline (2-amino-β-D-arabinofurano [1',2':4,5] 2-oxazoline) from cyanamide under room temperature, reduced temperature and elevated temperature conditions.

(a) A solution of D-arabinose (15.0 gm., 0.10 mole) and cyanamide (8.4 gm., 0.20 mole) in 30 ml. of 1 molar aqueous ammonia was heated at 60° C. for 30 minutes and, thereafter, chilled in an ice-salt bath and seeded with crystals of the aforementioned D-arabinofuranooxazoline. A white solid was produced which was filtered off, washed with a small amount of cold water and then air-dried. The weight of the dried white solid was 7.6 gm. (corresponding to a 44% yield) and it had a melting range of 167–169° C.

(b) The same amounts of D-arabinose and cyanamide as were employed in (a) were stirred overnight at room temperature in a mixture of 10 ml. of 1 molar aqueous ammonia and 20 ml. of methanol. This mixture or slurry was thereafter chilled in an ice-salt bath, filtered, washed with cold methanol and then air-dried. The yield of the resulting white dried solid was 10.2 gm. (59% yield), and it had a melting point between 171.5° C. and 172.5° C.

(c) The same amount of D-arabinose and cyanamide as were employed in (a) were stirred as a slurry for 5 hours at room temperature in a mixture of 5 ml. of 6 molar aqueous ammonia and 25 ml. of methanol. This mixture was stored at 4° C. over a weekend, then chilled in an ice-salt bath, filtered, washed with cold methanol and ether and then air-dried. The weight of the resulting white solid was 12.8 gm. (representing a yield of 73%) and the melting range of this product was 172.5° C. to 173.5° C.

A sample of the D-arabinofurano oxazoline product from (a) (melting point 167 to 167.5° C.) was submitted for elemental analysis. For $C_6H_{10}N_2O_4$, the following percentages were calculated: C, 41.40; H, 5.79; N, 16.08; O, 36.73. For the same formula, the following percentages were found: C, 41.25; H, 6.16; N, 15.59; O, 37.21. Recrystallization from a water-methanol solution yielded a pure white, microcrystalline, free-flowing powder having a melting point between 175.0° C. and 175.3° C., and the following analysis (percent): C, 40.97; H, 5.70; N, 16.08; O, 37.14.

EXAMPLE 2

This example illustrates the conversion of the aminooxazoline intermediate of Example 1 to the hydrochloride salt (1-β-D-arabinofurano-sylcytosine hydrochloride) of its corresponding nucleoside β-cytosine arabinoside.

The reaction mechanism is believed to be as follows:

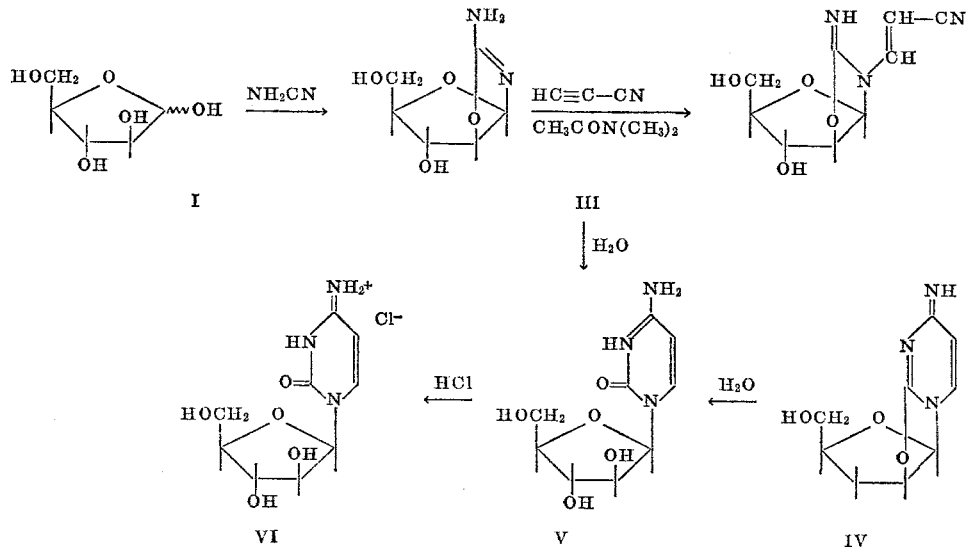

D-arabinose (37.0 gm., 0.246 mole) was converted to its corresponding aminooxazoline (I) (32.2 gm., 75% yield) as described in procedure (c) of Example 1.

This aminooxazoline (I) (32.2 gm., 0.185 mole) was suspended in N,N-dimethylacetamide (total volume about 185 ml.) and magnetically stirred while cyanoacetylene (11.6 ml., 9.5 gm. 0.185 mole) was added rapidly in two portions. A cold water bath was in place during this addition and was thereafter removed. The suspension rapidly turned yellow and heat was evolved. After 5 minutes, the solution was clear and deep red in color. The temperature at this time was about 45° C. and thereafter slowly decreased.[1] After 20 minutes of total reaction time, the solution was diluted with 185 ml. of 1 molar aqueous ammonia whereupon the solution temperature again rose to about 45° C.[2] After about 40 minutes, the solution was placed on a rotary evaporator and concentrated to a syrup (45.7 gm. 101%).

This syrup was dissolved in 100 ml. of methanol and 20 ml. of 12 molar hydrochloric acid were added. The resulting solution was placed on a rotary evaporator and pumped until most of the solvents had been removed. The residue was a tan cake of crystals which was recrystallized from 100 ml. of methanol. Additional crystals were obtained from the mother liquor after concentration and addition of ether. Attempts to remove the colors from the syrup in a methanol solution with activated charcoal were not completely effective. However, these colors were completely removed when the product was recrystallized. In this experiment, the combined yield of the hydrochloride salt (VI) was 43.3 gm. corresponding to a yield of 84% based upon the aminooxazoline starting material (I) and 63% based upon the starting arabinose.

Samples of the chloride salt (VI) synthesized according to this example and a commercial sample of this salt (Pierce Chemical Company) were identical by the following criteria: melting point, mixed melting point, U.V., I.R., optical rotatory dispersion spectra, electrophoresis and paper chromatography in ten different solvent systems.

The cytosine arabinoside (V) produced in Example 2 is an important anti-leukemic drug. As can be seen from the foregoing, this drug can be readily synthesized from relatively inexpensive starting materials in a substantially high yield. Additionally, and quite uniquely, only one isomer is produced by this process. This means that the normally complex steps required to separate isomers are not needed here. Thus, in an area of chemistry in which stereo effects are of major importance, and many reactions produce mixtures of isomers, only a single stereo isomer is produced by this method, thereby resulting in a more useful product.

At present, this drug (cytosine arabinoside) is obtained either from extraction in a somewhat different form from living matter or is synthesized from its sugar and pyrimidine components via several complex intermediate reactions. The compound extracted from living matter (β-cytidine) has an hydroxyl group on the 2 carbon of the sugar ring in a α-configuration, which is opposite to the β-configuration that it has in cytosine arabinoside. A common method of reversing this configuration involves heating with polyphosphoric acid followed by isolation and hydrolysis of the polyphosphate ester. Since this conversion is an incomplete one, steps are required to isolate the resulting isomers. In either case, the synthesis of cytosine arabinoside by such methods is substantially more complex and more expensive than the method described herein.

It will be understood that other compounds can be made from the cytosine arabinoside by well-known reactions. For example, uracil arabinoside may be made by substitution of an hydroxyl group for the 4-amino group in the cytosine ring; other modifications of both the pyrimidine ring and sugar ring are possible using well-known organic reactions.

The advantages and simplicity of isotope-labeling by the method of this invention will be described with reference to the reaction described in Example 2. However, it will be understood that the same advantages are produced by employing other simple reactants, e.g., cyanogen and electrophilic reagents other than cyanoacetylene. To label a desired compound, it is first necessary to label one of the atoms of one of the constituent groups making up that compound. In general, the simpler the constituents which make up the product and the simpler the reactions required to produce the product, the easier and more economical it is to obtain a product labeled in a specific position. For example, $C^{14}$ or $N^{15}$ labeled cyanamide is easily obtained, and $C^{14}$ labeled arabinose is commercially available. From these relatively inexpensive materials and the methods of Example 2, β-cytosine arabinoside which is specifically labeled in either the sugar or pyrimidine ring is easily obtained. Conventional methods of synthesizing the same compounds are more complicated and therefore much more expensive. For this reason, the method of this invention is very useful for isotope labeling of complex compounds and, in particular, for labeling those compounds which are biologically or pharmaceutically important and therefore very valuable for studies of metabolism and disease, and the study and development of drugs. For this reason alone, the method of this invention and the compounds therefrom are extremely important.

As previously described, in some cases it is necessary to introduce water into the reaction medium containing the aminooxazoline and an electrophilic reagent in order to produce a cyclonucleoside. This is shown in the reactions illustrated in Example 2. In the absence of water, the aminooxazoline reacts with the cyanoacetylene to produce the open-chain structure III which is a cyanovinyl adduct of the aminooxazoline. The addition of water results in the cyclization of this adduct to produce the cyclonucleoside IV. If water is initially present, together with the cyanoacetylene and the aminooxazoline, the reaction product is the cyclonucleoside IV if the pH is about pH 6–7; otherwise, hydrolysis at the cycloglycoside occurs and the product is the glycoside, cytosine arabinoside (V).

EXAMPLE 3

This example illustrates the conversion of another pentose sugar (D-ribose) to its corresponding aminooxazoline by reaction with cyanamide and further conversion to cytidine. The synthesis of the aminooxazoline proceeds according to the following reaction:

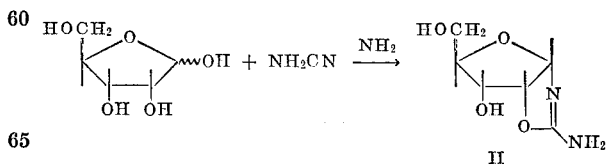

It will be seen from the above reaction that, since the hydroxyl group attached to the adjoining or 2-carbon atom of D-ribose is oriented in a direction opposite to that of the 2-carbon hydroxyl group of the D-arabinose, the orientation of the oxazoline ring in the product (II) derived from the D-ribose is opposite to that of the oxazoline ring in the product (I of Example 2) derived from D-arabinose.

---

[1] At this point, the ultraviolet spectrum of an aliquot diluted in water (pH of about 6) showed a maximum at 258 millimicrons which is attributed to the cyanovinyl adduct III. The spectrum rapidly shifted to one with a $\lambda_{max.}$ of 262 millimicrons after dilution of the aliquot with water which is the result of cyclization to the cyclonucleoside IV. If the aqueous aliquot solution is made alkaline, the hydrolysis of IV occurs and the spectrum shifts to that of V ($\lambda_{max.}$ 271 millimicrons).

[2] After the addition of ammonium hydroxide, aliquots were diluted periodically and their ultraviolet spectra were recorded. These spectra showed a clean conversion of III to V, in quantitative or near quantitative yields with a half-life of III of about 5 minutes.

A solution of D-ribose (15.0 gm., 0.10 mole) and cyanamide (8.4 gm., 0.20 mole) in 100 milliliters of 1 molar aqueous ammonia was heated at 60° C. for 1 hour and then refrigerated overnight at 4° C. A first crop of 12.5 gm. of white crystals was filtered off. The mother liquor was evaporated, stirred with methanol and then filtered, yielding a second crop of 2.6 gm. of white crystals. The combined yield was then 15.1 gm. corresponding to an 87% yield. Recrystallization of these white crystals from water gave a pure white, finely granular solid having a melting point of 195° C. It was calculated that the product $C_6H_{10}N_2O_4$ should have the following percentage composition: C, 41.40; H, 5.79; N, 16.08; O, 36.73. It was found that the product had the following percentage composition: C, 41.50; H, 6.15; N, 15.99; O, 36.74.

Without separating the aminooxazoline (II), aqueous ammoniacal solutions of D-ribose (3 mmoles in 3 ml. of 1 N ammonia solution) were first warmed over a steam bath with cyanamide (6 mmoles in 27 ml. of water) for 15 minutes and again after adding cyanoacetylene (9 mmoles) for an additional 1.5 hr. Yields of about 20% of 1-α-D-ribofuranosylcytosine (VIII) (α-cytidine) and about 20% of a compound thought to be 1-α-D-ribopyranosylcytosine (VII) were obtained. Only traces of the β-anomer of VIII were produced.

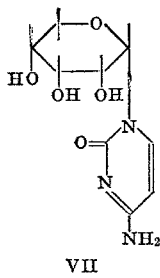
VII

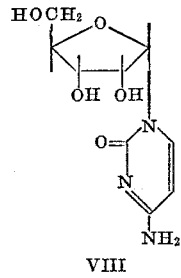
VIII

Even though 1-α-D-ribofuranosylcytosine (α-cytidine) is an anomer (isomer) of the β-cytidine that is found in living matter, traces of this nucleoside have been found in RNA. At present, its purpose and function in RNA is not presently known.

EXAMPLE 4

This example illustrates the use of phosphated reducing sugars, e.g., (D-ribose-5-phosphate) to synthesize their corresponding glycosides, e.g., α-cytidine.

Under substantially the same conditions and concentrations as described in the third paragraph of Example 3, aqueous ammoniacal solutions of D-ribose-5-phosphate were warmed first with cyanamide and again after adding cyanoacetylene (cytidylic acid). Yields of about 40% of 1-α-D-ribofuranosylcytosine-5'-phosphate were obtained. Alkaline dephosphorylation of the cytidylic acid produced 1-α-D-ribofuranosylcytosine (VIII) (α-cytidine) which was produced in Example 3. Only traces of the β-anomer of the latter were produced.

EXAMPLE 5

This example illustrates the synthesis of cytosine arabinoside from D-arabinose without isolating the intermediate aminooxazoline as was done in Example 2.

Under substantially the same conditions and concentrations as described in the third paragraph of Example 3, an aqueous ammoniacal solution of D-arabinose (3 mmoles) was warmed first with cyanamide (6 mmoles) and thereafter with cyanoacetylene (9 mmoles). Yields of about 15% of 1-β-D-arabinofuranosylcytosine (V) (cytosine arabinoside) which was also produced in Example 2 and about 15% of a compound thought to be 1-β-arabinopyranosylcytosine were produced.

EXAMPLE 6

This example illustrates the use of cyanogen and cyanogen plus ammonia in place of cyanamide.

The same reaction as was described in Example 4 was performed except that an equal amount of cyanogen was substituted for cyanamide. Cytidylic acid was formed but in lower yields of about 2–7%. In the absence of ammonia pH adjusted to 8–9 with NaOH), the yields of cytidylic acid were 20% using cyanamide and 0.2% using cyanogen.

EXAMPLE 7

This example illustrates the use of a haloacrylonitrile (β-chloroacrylonitrile) as the electrophilic reagent.

An aqueous ammoniacal solution of D-ribose-5-phosphate (0.1 molar in the sugar) was warmed at 100° C. for 5 minutes with cyanamide (0.2 molar) and then divided into two portions. One portion was heated at 100° C. for 2 hr. with cyanoacetylene (0.2 molar) and the other portion was heated at 100° C. for two hours with β-chloroacrylonitrile (1:1 cis:trans) (0.2 molar). Paper chromatography showed the presence of α-cytidylic acid in about equal yields in each soultion.

EXAMPLE 8

This and the following example illustrate the use of methyl propiolate as the electrophilic reagent.

A solution of 1.7 gm. (9.8 mmoles) of the aminooxazoline derivative of D-arabinose in 10 ml. of 1 molar aqueous ammonia solution was made up to 1.2 molar in methyl propiolate. This solution was heated at 60° C. for 15 minutes and at 100° C. for 30 minutes. The resulting mixture yielded 0.42 gm. (18% yield) of the cyclonucleoside XII having a melting range of 247° C. to 249° C. Analytical calculations for this cyclonucleoside having a formula of $C_9H_{10}N_2O_5$ produced the following percentage composition: C, 47.80%, H, 4.46%; N, 12.41%; O, 35.35%. The following percentage composition was found: C, 47.76%; H, 4.69%; N, 11.92%; O, 35.60%.

Acid-catalyzed hydrolysis of this cyclonucleoside XII produced the arabinoside XIII in good yields:

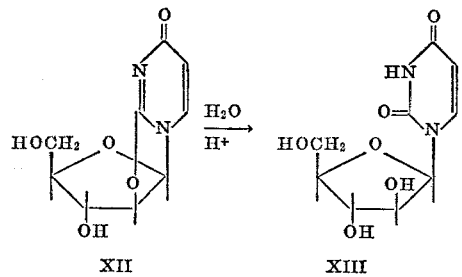
XII        XIII

This arabinoside XIII is uracil arabinoside or spongouridine and may also be produced by hydrolysis of β-cytosine arabinoside (V) as described in Example 2. Spongo-uridine is a naturally-occurring compound which is found in and used by a marine sponge. Thus, it is useful for studies in this connection. Additionally, because it could be produced by enzymatic action from cytosine arabinoside in the human body, it is useful for studying metabolic processes.

EXAMPLE 9

A solution of 1.7 gm. (9.8 mmoles) of the aminooxazoline (II) derived from D-ribose in 10 milliliters of aqueous ammonia solution was made up to 2.0 molar in methyl propiolate. This solution was heated at 60° C. for 15 minutes and at 100° C. for 30 minutes.

The resulting mixture yielded 0.86 gm. (36% yield) of the corresponding cyclonucleoside (XIV) having a melting point of 223° C. to 225° C. Analytical calculation for the percentage composition of this compound ($C_9H_{10}N_2O_5$)

gives: C, 47.80%; H, 4.46%; N, 12.41%; O, 35.35%. The percentage breakdown was found to be C, 48.02%; H, 4.65%; N, 11.93%; O, 35.20%. Acid-catalyzed hydrolysis of this cyclonucleoside (XIV) produced the riboside XV in good yields.

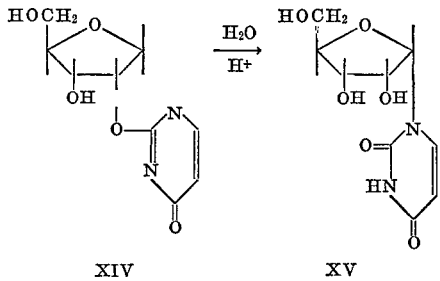

XIV  XV

EXAMPLE 10

This example illustrates the use of dimethylacetylene dicarboxylate as the electrophilic reagent.

A solution which was 0.1 molar in the aminooxazoline from D-ribose and 1.0 molar in ammonia was heated at 60° C. for 15 minutes and at 100° C. for 1 hour. Paper chromatography showed the presence of an ultraviolet light-absorbing product whose spectrum was as follows: $\lambda_{max}$. 268 millimicrons in acid; $\lambda_{max}$. 264 millimicrons in base. The ultraviolet spectrum of β-orotidine is reported to be: $\lambda_{max}$. 267 millimicrons in acid; $\lambda_{max}$. 265 millimicrons in base. Although the structure of α-orotidine has not been proven, it is believed to be the product formed in this example. This is because the ultra-violet spectrum of α- and β-orotidine are expected to be the same and because the product formed here must have an α- rather than a β-configuration because the oxazoline ring from ribose has an α-configuration.

EXAMPLE 11

This example illustrates the formation of aminooxazolines from sugars having from 2 to 12 carbon atoms.

A number of aqueous solutions were prepared with each solution having the following general composition: sugar: 0.10 molar; ammonia: 0.10 molar; and cyanamide: 0.20 molar. The sugar employed in each solution is set out in Table I below. The pH of each solution was between about pH 10 and pH 11. Each solution was placed in a 60° C. bath and heated for a period in excess of 3 hours. Aliquots were removed for analysis from each solution prior to heating the solutions and after 5 minutes, 30 minutes, and 3 hours of heating.

Analyses of these aliquots were made by descending paper chromatography using water-saturated n-butyl alcohol as a solvent. Sugars were detected on the chromatograms by spraying with aniline phthalate and aminooxazolines were detected with a dibromoquinone-N-chloromimide spray. The chromotographic results are set forth in Table I below:

TABLE I

| Sugar used | Rf of the sugar | Approx. half-life of sugar | Rf of the aminooxazoline product |
|---|---|---|---|
| Glycolaldehyde | 0.8 | 2 minutes | 0.17 |
| DL-glyceraldehyde | 0.43 | 1 minute or less | 0.19 |
| D-erythrose | 0.28 | 1 minute | 0.29 |
| D-ribose | 0.18 | 10 minutes | 0.21 |
| D-arabinose | 0.08 | 40 minutes | 0.23 |
| D-glucose | 0.08 | 3 hours | 0.17 |
| D-fructose | 0.11 | do | 0.18 |
| D-lactose | 0.02 | do | 0.02 |

Aminooxazolines previously prepared from D-ribose and D-arabinose were compared chromatographically with the products produced from D-ribose and D-arabinose in this example and were found to be the same.

Aminooxazolines are believed to have been formed in all cases for several reasons. First, the Rf values were approximately those which would be expected from aminooxazolines formed from the sugars, i.e., the Rf's were about the same as those of the products from ribose and arabinose. Secondly, there was no reaction of the products from each of the above sugars with aniline phthalate. Since reaction with aniline phthalate is a characteristic of reducing sugars, the lack of a reaction indicates that the resulting products were non-reducing sugars, i.e., their hemiacetal carbons had been masked by reactions with cyanamide. Thirdly, dibromoquinone-N-chloroimide reacts with the aminooxazoline compounds derived from ribose and arabinose to give characteristic brown colors, and these same typical color reactions were produced by the products formed from each of the other sugars.

The yield in each of these reactions was estimated to be at least about 50%.

EXAMPLE 12

This example illustrates the reactions by which glycosides can be synthesized from aminooxazolines by reaction with β-diketones and β-ketoesters.

The aminooxazoline (I) of Example 1, which was derived from D-arabinose, may be reacted with ethyl acetoacetate (a ketoester) using the reaction conditions described in Example II. The primary product is 6-methyl-1-β-D-arabinofuranosyluracil and has the structure (XVI) shown below:

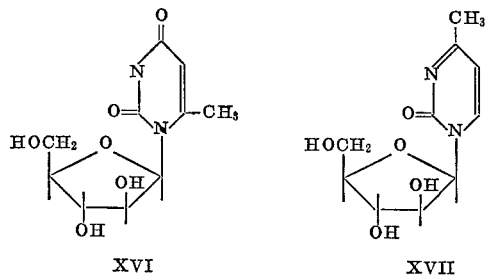

XVI  XVII

Similarly, by employing acetoacetaldehyde (a β-diketone) in place of ethyl acetoacetate, the glycoside (XVII) (4-methyl-1-β-D-arabinofuranosylpyrimidine-2-one) may be formed.

EXAMPLE 13

This example illustrates the synthesis of $O^2,2'$-cyclocytidine acetate and $O^2,2'$ - cyclouridine from the same aminooxazoline using different electrophilic reagents.

Five ml. of concentrated ammonia solution (15 M) and 8.4 grams of cyanamide were added to a slurry of 15.0 grams (0.10 mole) of D-arabinose and 50 ml. of methanol in an Erlenmeyer flask. The flask was stoppered and the slurry was stirred magnetically at about 30° C. for 4 hours. The slurry was then chilled in an ice bath and filtered. After washing the product with 50 ml. of cold methanol and air-drying it, a 14.1–14.2 gram yield (81–82%) of a white powder having a melting point of 175° C.–176° C. was produced. This product was recrystallized by dissolving it in hot water and thereafter diluting with methanol. The melting point of the recrystallized product was 175° C.–176° C. which indicated that it was substantially pure. This product was identified as 2-amino-β-arabinofurano [1',2':4,5] 2-oxazoline. Identification was determined by comparing this product with the previously-identified aminooxazoline produced in Example 1.

A suspension of 6.96 grams (0.040 mole) of this aminooxazoline in 20 ml. of N,N-dimethylacetamide was stirred magnetically in a 50 ml. Erlenmeyer flask fitted with a serum cap. The flask was partially evacuated, then stirred in a tap water cooling bath at 15° C.–20° C. while 2.50 ml. (0.040 mole) of cyanoacetylene was injected by syringe. After 30 minutes, the mixture was darkly colored but clear. Glacial acetic acid (4.6 ml., 0.080 mole) was added and the mixture was transferred to a 500 ml. roundbottom flask, along with a water rinse of 30 ml. After 30 minutes, 150 ml. of toluene were added and then evaporated off using a rotary evaporator and a water bath maintained at 40° C.–50° C. A second portion of 150 ml. of toluene was added and evaporated off. The residue was disolved in 100 ml. of boiling methanol. Then 200 ml. of hot ethyl acetate were added with swirling. After cooling in ice, filtering, washing with ethyl acetate and air drying, the yield of off-white, matted needles (M.P. 175° C.–176° C.) was 10.3–10.8 grams (90–94%). The product ($O^2,2'$-cyclocytidine acetate) was recrystallized by dissolving it in 150 ml. of boiling methanol and then diluting with 150 ml. of hot ethyl acetate. The white, matted needles after vacuum drying weighed 9.4–10.0 grams (82–88%) and melted at 178° C.–179° C.

The crude and recrystallized products showed identical U.V. spectra in $H_2O$: $\lambda_{max}$. 231.5, 262.5 m$\mu$ ($\epsilon$ 8600, 9700), $\lambda_{min}$. 243 m$\mu$ ($\epsilon$ 6300). The literature gives the following data for the $O^2,2'$-cyclocytidine HCl salt in water: $\lambda_{max}$. 231, 262 m$\mu$ ($\epsilon$ 9400, 10600), $\lambda_{min}$. 243 m$\mu$ ($\epsilon$ 6500).

In a second reaction, a suspension of 6.96 grams (0.040 mole) of the same aminooxazoline in 100 ml. of ethanol and 10.1 ml. (0.12 mole) of methyl propiolate was heated under reflux with magnetic stirring for one hour. The suspension was cooled in an ice bath, filtered and washed with 50 ml. of cold ethanol. After air-drying, the yield of white, crystalline powder (M.P. 242° C.–243° C.) was 6.0–6.4 grams (66–71%). As judged by its U.V. spectrum, this material was 98–99% pure. This product ($O^2,2'$-cyclouridine) was recrystallized by dissolving it in 20 ml. of hot water, diluting with 100 ml. of hot ethanol and then cooling. The yield of glistening white needles (M.P. 247° C.–248° C.) was 5.0–5.5 grams (55–61%).

This product had the following U.V. spectrum in water: $\lambda_{max}$. 223, 250 m$\mu$ ($\epsilon$ 8400, 8200), $\lambda_{max}$. 243.5 m$\mu$ ($\epsilon$ 6600). The literature gives the following data for $O^2,2'$-cyclouridine: $\lambda_{max}$. 223–223.5, 249.5–251 m$\mu$ ($\epsilon$ 7860, 7860), $\lambda_{min}$. 234 m$\mu$ ($\epsilon$ 5990); M.P. 234° C.–236° C.

Both $O^2,2'$-cyclocytidine and $O^2,2'$-cyclouridine are of particular interest because of their relation to the naturally-occurring pyrimidine ribonucleosides. They are readily hydrolyzed in high yields to cytosine arabinoside (a tumor growth inhibitor) and to uracil arabinoside (spongo-uridine), respectively. $O^2,2'$-cyclouridine has also been employed for the synthesis of a variety of compounds such as, for example, 2'-halogeno-2'-deoxyuridines, isocytosine arabinoside, 3'-deoxyuridine and 2'-deoxyuridine.

EXAMPLE 14

This example and Examples 15 and 16 illustrate the synthesis of glycosides from various substituted reducing sugars.

By following the same procedure described in Examples 1 and 2, but substituting 5-O-benzoyl-D-arabinose (substituted reducing sugar) for D-arabinose, the glycoside product, $\beta$-cytosine arabinoside 5'-benzoate ester (5',O-benzoyl - 1 - $\beta$-D-arabinofuranosylcytosine) is produced rather than cytosine arabinoside (V).

EXAMPLE 15

The same series of reactions, as described in Example 3, may be carried out using 3-5-di-O-acetyl-D-ribose as the starting reducing sugar in place of D-ribose. If this substitution is made, the glycoside product is 1-$\alpha$-D-ribofuranosyluracil).

EXAMPLE 16

By substituting D-arabinose-3,5-diphosphate for D-ribose -5-phosphate, and otherwise performing the steps of Example 4, an aminooxazoline, 2-amino-$\beta$-D-arabinofurano [1',2':4,5]-2-oxazoline-3'-,5'-diphosphate, can first be produced. This aminooxazoline can be converted by reaction with cyanoacetylene in the presence of water to the glycoside, $\beta$-cytosine arabinoside-3'5'-diphosphate.

In the claims which follow, the term "hemiacetal carbon" is used to designate the carbon atom in the reducing sugar heretofore described by the terms "hemiacetal carbon" and "carbonyl carbon."

We claim:
1. A process for producing an aminooxazoline comprising the steps of:
reacting a reducing sugar with a member of the group consisting of a (a) cyanamide and (b) cyanogen plus ammonia, in a solvent therefor to provide an aminooxazoline, said reducing sugar having a hydroxyl group attached to a carbon atom adjoining the hemiacetal carbon atom of said reducing sugar;
and recovering said aminooxazoline from the resulting composition.

2. The process of claim 1 wherein said reducing sugar is one of the group of monosaccharides, disaccharides and polysaccharides.

3. The process of claim 1 wherein said reducing sugar is one of the group consisting of glycolaldehyde, glyceraldehyde, erythrose, ribose, arabinose, glucose, fructose, sorbose, mannose, galactose, dihydroxyacetone, erythrulose, xylulose, ribulose, lactose, maltose, maltotriose and manniotriose.

4. The process of claim 1 wherein said reducing sugar is admixed with one of said cyanamide and cyanogen plus ammonia in the presence of water.

5. The process of claim 1 wherein said solvent is water.

6. The process of claim 1 wherein said solvent is methanol.

7. The process of claim 1 wherein said reducing sugar is admixed with cyanamide and wherein the molar ratio of said cyanamide to said reducing sugar is at least about 1:1.

8. The process of claim 1 wherein said reducing sugar is reacted with said cyanogen and said ammonia, the molar ratio of said cyanogen to said reducing sugar being at least about 1:1 and the molar ratio of said ammonia to said reducing sugar being at least about 1:1.

9. The process of claim 1 wherein said reaction takes place in a medium having a pH between about pH 6 and about pH 12.

10. The process of claim 1 wherein said reaction takes place in a medium having a pH between about 8 and about 10.

11. The process of claim 7 wherein said molar ratio is broken about 1:1 and about 2:1.

12. The process of claim 8 wherein said molar ratio of cyanogen to reducing sugar is between about 1:1 and about 10:1.

13. The process of claim 12 wherein said molar ratio of ammonia to reducing sugar is between about 1:1 and about 3:1.

14. The process of claim 1 wherein said aminooxazoline is reacted with an electrophilic reagent selected from the group consisting of cyanoacetylene, methyl propiolate, a dimethyl acetylenedicarboxylate, and a haloacrylonitrile, in the presence of a solvent for said aminooxazoline and said electrophilic reagent to form a cycloglycoside.

15. The process of claim 1 wherein said aminooxazoline is reacted with an electrophilic reagent selected from the group consisting of $\beta$-diketones and $\beta$-ketoesters to form a cycloglycoside.

16. The process of claim 15 wherein said $\beta$-diketones and said $\beta$-ketoesters are selected from the group consisting of methyl acetoacetate, ethyl acetoacetate, propyl acetoacetate, $\alpha$-ethyl methyl acetoacetate, ethyl benzoylacetate, acetoacetaldehyde, acetylacetone, and 3-methyl-2,4-pentanedione.

17. The process of claim 14 wherein said aminooxazoline is first isolated before said reaction with said electrophilic reagent.

18. The process of claim 17 wherein said aminooxazoline and said electrophilic reagent are reacted together in the presence of water.

19. The process of claim 18 wherein said cycloglycoside is hydrolyzed to its corresponding glycoside.

20. The process of claim 14 wherein the molar ratio of said electrophilic reagent to said aminooxazoline is at least about 1:1.

21. The method of claim 19 wherein said reducing sugar is D-arabinose and wherein said glycoside is β-cytosine arabinoside.

22. A process for synthesizing cycloglycosides comprising:
reacting (a) an aminooxazoline comprising a sugar unit and an aminooxazoline ring unit, said sugar unit and said aminooxazoline ring unit being joined together at two points such that they share the hemiacetal carbon and the adjacent carbon atom of said sugar unit; with
(b) an electrophilic reagent selected from the group consisting of cyanoacetylene, methyl propiolate, dialkyl acetylenedicarboxylates and haloacrylonitriles, in a solvent therefor; and recovering said cycloglycoside.

23. The process of claim 22 wherein said reaction is initially carried out in the presence of water.

24. The process of claim 22 wherein said cycloglycoside is hydrolyzed to the corresponding glycoside.

25. A process for synthesizing cycloglycosides comprising:
reacting (a) an aminooxazoline comprising a sugar unit and an aminoxazoline ring unit, said sugar unit and said aminooxazoline ring unit being joined together at two points such that they share the hemiacetal carbon and the adjacent carbon atom of said sugar unit; with
(b) an electrophilic reagent selected from the group consisting of unsubstituted, alkyl-substituted and phenyl-substituted acyclic β-diketones and unsubstituted alkyl-substituted and phenyl-substituted acyclic β-ketoesters,
in a solvent therefor; and recovering said cycloglycoside.

26. The process of claim 25 wherein said electrophilic reagent is selected from the group consisting of methyl acetoacetate, ethyl acetoacetate, propyl acetoacetate, α-ethyl methyl acetoacetate, ethyl benzoylacetate, acetoacetaldehyde, acetylacetone, and 3-methyl-2,4-pentanedione.

27. The process of claim 25 wherein said reaction is initially carried out in the presence of water.

28. The process of claim 25 wherein said cycloglycoside is hydrolyzed to its corresponding glycoside.

29. An aminooxazoline which consists essentially of (a) a sugar unit having a hemiacetal carbon and an adjacent carbon atom and (b) an aminooxazoline ring unit, said hemiacetal carbon and said adjacent carbon atom forming a portion of said aminooxazoline ring unit and being bonded to a nitrogen atom and to an oxygen atom in said aminooxazoline ring unit, respectively.

References Cited
UNITED STATES PATENTS

| | | | |
|---|---|---|---|
| 3,322,747 | 5/1967 | Shen et al. | 260—211.5 |
| 3,463,850 | 8/1969 | Shen et al. | 260—211.5 |

LEWIS GOTTS, Primary Examiner

J. R. BROWN, Assistant Examiner

U.S. Cl. X.R.

260—999